(12) United States Patent
Song

(10) Patent No.: US 8,976,647 B2
(45) Date of Patent: Mar. 10, 2015

(54) HARDWARE-BASED DYNAMIC LOAD BALANCING THAT AVOIDS FLOW PACKET REORDERING STATISTICALLY

(75) Inventor: Haoyu Song, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 258 days.

(21) Appl. No.: 13/291,198

(22) Filed: Nov. 8, 2011

(65) Prior Publication Data

US 2013/0114414 A1 May 9, 2013

(51) Int. Cl.
*H04L 12/28* (2006.01)
*G06F 15/16* (2006.01)
(Continued)

(52) U.S. Cl.
CPC .............. *H04L 47/34* (2013.01); *H04L 47/125* (2013.01)
USPC ........ 370/229; 370/395.2; 709/230; 709/238; 711/202; 711/216; 711/221; 726/13

(58) Field of Classification Search
CPC ..... H04L 47/10; H04L 47/2441; H04L 47/30; H04L 47/32; H04L 12/5693; H04L 45/22; H04L 29/0653; H04L 49/3009; H04L 45/00; H04L 45/745; H04L 45/7453; H04L 67/1023; H04L 67/1065; H04L 9/06; H04L 9/0643; H04L 29/12066; H04L 61/1511; H04L 29/12009; H04L 29/08072; H04L 49/90; H04L 29/06; H04L 29/06095; H04L 12/5602; H04L 12/5695; H04L 29/0809; H04L 29/06068; H04L 29/08144; H04L 29/08549; H04L 45/54; H04L 47/11; H04L 47/12; H04L 47/15; H04L 47/22; H04L 47/27; H04L 63/0227; H04L 63/0236; H04L 63/0263; H04L 63/1408; H04L 63/1441; H04L 2012/5632; H04L 2012/5635; H04L 2012/5636; G06F 17/30949; G06F 12/0864; G06F 12/1018; G06F 9/34; G06F 3/067; G06F 3/0383; G06F 9/35; G06F 12/10; G06F 12/0292; G06F 12/0246; G06F 12/0284; G06F 12/1027; G06F 17/30286; H04Q 11/0478
USPC ......... 370/235.1, 237, 389, 392, 395.32, 401, 370/351, 229–235, 395.2; 709/245, 250, 709/230, 238; 711/200, 216, 202, 221; 707/698, 747, 999.003, E12.017, 707/E17.036; 726/13
See application file for complete search history.

(56) References Cited

U.S. PATENT DOCUMENTS 7,571,299 B2 *  8/2009  Loeb ............................. 711/216
7,830,919 B1 * 11/2010  Thompson .................... 370/469
(Continued)

FOREIGN PATENT DOCUMENTS

CN         101577705 A       11/2009

OTHER PUBLICATIONS

Foreign Communication From a Counterpart Application, PCT Application PCT/CN2012/084294, International Search Report dated Feb. 14, 2013, 6 pages.
(Continued)

*Primary Examiner* — Alpus H Hsu
*Assistant Examiner* — Dharmesh Patel
(74) *Attorney, Agent, or Firm* — Conley Rose, P.C.; Grant Rodolph; Brandt D. Howell

(57) ABSTRACT

A network component comprising a hash generator configured to generate a first hash value using a first hash function and a packet, and generate a second hash value using a second hash function and the packet, a memory comprising a first hash table related to the first hash function and a second hash table related to the second hash function, the first and second hash tables comprising one or more entries, the one or more entries comprising a signature, a timestamp, and a path identification, a comparator configured to compare the first hash value and the second hash value with the one or more entries, and a forwarding decision module configured to forward the packet on a selected path.

19 Claims, 5 Drawing Sheets

(51) Int. Cl.
*G06F 15/173* (2006.01)
*G06F 9/26* (2006.01)
*G06F 9/34* (2006.01)
*G06F 17/00* (2006.01)
*H04L 12/801* (2013.01)
*H04L 12/803* (2013.01)

(56) References Cited

U.S. PATENT DOCUMENTS

| | | | |
|---|---|---|---|
| 2004/0150422 A1* | 8/2004 | Wong | 326/41 |
| 2004/0220975 A1* | 11/2004 | Carpentier et al. | 707/200 |
| 2005/0171937 A1* | 8/2005 | Hughes et al. | 707/3 |
| 2005/0213570 A1* | 9/2005 | Stacy et al. | 370/389 |
| 2007/0286194 A1* | 12/2007 | Shavitt et al. | 370/392 |
| 2007/0297410 A1 | 12/2007 | Yoon et al. | |
| 2008/0229056 A1* | 9/2008 | Agarwal et al. | 711/216 |
| 2009/0225676 A1* | 9/2009 | Kisela et al. | 370/252 |
| 2011/0013639 A1* | 1/2011 | Matthews et al. | 370/395.32 |
| 2011/0249676 A1 | 10/2011 | Singh et al. | |

OTHER PUBLICATIONS

Foreign Communication From a Counterpart Application, PCT Application PCT/CN2012/084294, Written Opinion dated Feb. 14, 2013, 5 pages.

* cited by examiner

HARDWARE-BASED DYNAMIC LOAD BALANCING THAT AVOIDS FLOW PACKET REORDERING STATISTICALLY

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Current Internet Protocol (IP) networks comprise a plurality of nodes, including a plurality of routers at the core of the network and a plurality of hosts at the edge of the network. The routers collectively link the communication channels between hosts. The nodes are assigned network-wide unique IP addresses to enable proper and efficient traffic forwarding to destination nodes. The routers route packets in the IP networks based on the IP addresses carried in the packets. The packets are forwarded by the routers to proper destinations based on a <source address, destination address> pair, which may be indicated in each packet. The routers may have a plurality of ports. The ports may be used to send and/or receive packets to and/or from the IP network. Certain routers may be configured to load-balance. Load-balancing includes distributing packets received at an input port across several output ports, in attempt to balance the number of packets output from each port. Load-balancing may prevent congestion on certain paths through the network by distributing packets to other less used paths. Load-balancing may also used in a router internally when the single processing pipeline cannot process all the packets and the packets are sent to multiple parallel processing pipelines.

SUMMARY

In one embodiment, the disclosure includes a network component comprising a hash generator configured to generate a first hash value using a first hash function and a packet, and generate a second hash value using a second hash function and the packet, a memory comprising a first hash table related to the first hash function and a second hash table related to the second hash function, the first and second hash tables comprising one or more entries, the one or more entries comprising a signature, a timestamp, and a path identification, a comparator configured to compare the first hash value and the second hash value with the one or more entries, and a forwarding decision module configured to forward the packet on a selected path.

In another embodiment, the disclosure includes a method for hardware based load balancing comprising the steps of receiving a packet, generating, in parallel, a first hash value by applying a first hash value to the packet and a second hash value by applying a second hash value to the packet, determining if the first hash value is present in a first hash table, the first hash table corresponding to the first hash function, determining if the second hash value is present in a second hash table, the second hash table corresponding to the second hash function, and forwarding the packet based upon the determination.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
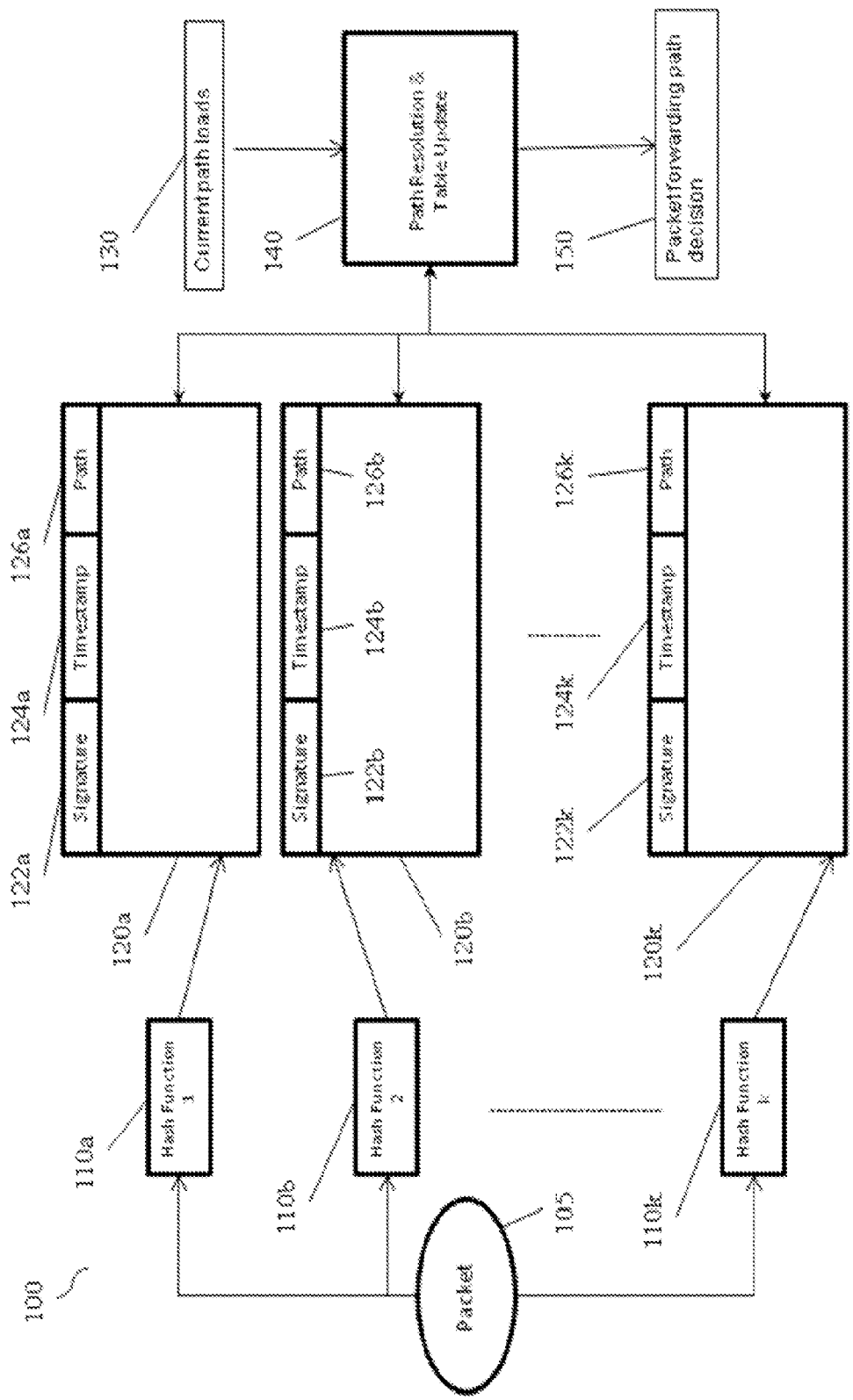
FIG. 1 is a schematic diagram of an embodiment of a hardware-based dynamic load balancing scheme avoiding packet reordering statistically.

It should be understood at the outset that although an illustrative implementation of one or more embodiments are provided below, the disclosed systems and/or methods may be implemented using any number of techniques, whether currently unknown or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As technology and networks evolve, the amount of data transported through networks continues to increase. Transported data may be referred to herein as packets, network traffic, or simply, traffic. Packets may be routed through a network using a router or some other traffic management device. While the implementations described herein may reference a router, it should be understood that any packet directing device may be used to implement the embodiments described herein. Routers may be configured to distribute received traffic as evenly as possible across several output ports. Traffic across several output ports may not be exactly equal, but may be substantially equal over time or instantaneously at the output ports. Routers currently in use may implement load-balancing. A problem associated with load balancing is ensuring that packets in a particular flow arrive in order at their destination. Receiving packets out of order may require processor intensive reordering at the destination and may also cause the destination to request the packets to be resent unnecessarily.

At present, one method of avoiding packet reordering is to force all packets from the same flow through the same path. The packets may be sent down the same path by hashing the header. Packets with the same hash value are sent down the same path thus retaining order of the packets, as long as the path mimics a first in first out (FIFO) processing. While this reduces the need to reorder packets at the destination, it is not very effective for load balancing purposes. Merely hashing may not guarantee a balanced load distribution. The unbalanced load distribution may be related to the probabilistic distribution variation of the hash function, the flow dynamic, and/or the flow size. Based upon these problems, hashing may lead to 30% to 50% throughput loss. Overloaded paths may also result in excess processing latency that negatively impacts system performance.

Disclosed herein is a system and method for hardware-based dynamic load balancing that avoids flow packet reordering statistically. The system provides for automatically committing a newly received flow to the least loaded path. After, the flow may be redirected to a currently least loaded path if the redirection is unlikely to cause reordering problems. The system may not keep track of flow status which is typically expensive to implement. However, the invention may use multiple small hash tables to summarize the flow timing information and make optimal decisions regarding flow redirection for load balancing.

FIG. 1 illustrates an embodiment of a hardware-based dynamic load balancing scheme avoiding packet reordering statistically architecture 100. The hardware-based dynamic load balancing scheme avoiding packet reordering statistically architecture 100 comprises k hash functions 110a, b, k. Where k may be any number of hash functions as determined according to system needs. Each hash function 110a, b, k has a corresponding hash table 120a, b, k. The hardware-based dynamic load balancing scheme avoiding packet reordering statistically architecture 100 further comprises a current path load module 130, a path resolution and table update module 140, and a packet forwarding path decision module 150.

Each of the hash tables 120a, b, k may contain one or more rows, each row may contain a flow signature 122a, b, k, a timestamp 124a, b, k, and a path identification (ID) 126a, b, k. The timestamps 124a, b, k may indicate the time of the most recently seen packet belonging to the flow bearing the signature 120a, b, k.

The current path load module 130 may use a simple counter scheme to determine path load. The counter may keep track of the total number of bytes, packets, and or flows distributed on each path. Whether the counter tracks bytes, packets, or flows may be determined based upon application criterion on load balancing. In another embodiment, the current path load module 130 may determine a real-time load index for each path which may then be compared to determine the least loaded path. The least loaded path information is delivered to the path resolution and table update module 140.

When a packet 105 arrives at a router or other packet forwarding device the packet may be hashed by each of the k hash functions 110a, b, k in parallel. The hash key is extracted from the packet 105 header. Each hash key may identify a flow for which packet order may be maintained. The hash value resulting from applying the hash function 110a, b, k to the packet 105 header addresses an entry in the corresponding hash tables 120a, b, k. For example, the hash value may contain m bits and the hash table may contain $2^n$ entries. The first n bits of the hash value may be used as a hash table address, the remaining m-n bits may be used as the flow signature 122a, b, k.

Each packet may generate k hash values, each of which corresponds to an entry in the hash tables 120a, b, k. The path resolution and table update module may examine each of the k entries in the tables with three possible outcomes. The first possible outcome occurs if the packet 105 has a signature that matches a signature in the tables 120a, b, k. In this case, the packet 105 is deemed to belong to the flow it matches in the hash tables 120a, b, k. The packet 105 is forwarded down the path indicated by the path ID 126a, b, k in the matching entry. The timestamp 124a, b, k is updated with the current time and processing continues.

The second possible outcome occurs if there is no matching signature in the hash tables 120a, b, k and there is at least one empty table entry. In this case, the flow is assigned to the least loaded path as determined by the current path loads module 130. The path resolution and table update module 140 then writes the flow's signature, timestamp, and path ID to the hash table 120a, b, k with the empty entry.

The third possible outcome occurs if there is no matching signature and there is no empty table entry. In this case, the flow is assigned to the least loaded path as determined by the current path loads module 130. Next, the oldest flow must be evicted from the hash tables 120a, b, k. The oldest flow is determined by analyzing the timestamps in each table and replacing the entry with the oldest timestamp with the entry for the current flow.

In certain cases, two different flows may have the same signature, however the probability is very low if a large hash value is chosen. Two different flows may have the same signature due to a hash collision. When applying the same hash function to two different keys, in some cases, it may generate the same n-bit hash value. In such a case, the signatures of the two flows are the same and it may not be possible to differentiate the two different keys. However, the collision probability becomes smaller when n is larger (i.e., $0.5^n$). In the disclosed scheme, even when a collision happens, no special treatment is needed. Rather, the two packets are merely treated as if they belong to the same flow. As long as the probability of collision is small, this does not affect the performance significantly.

Figure 2:
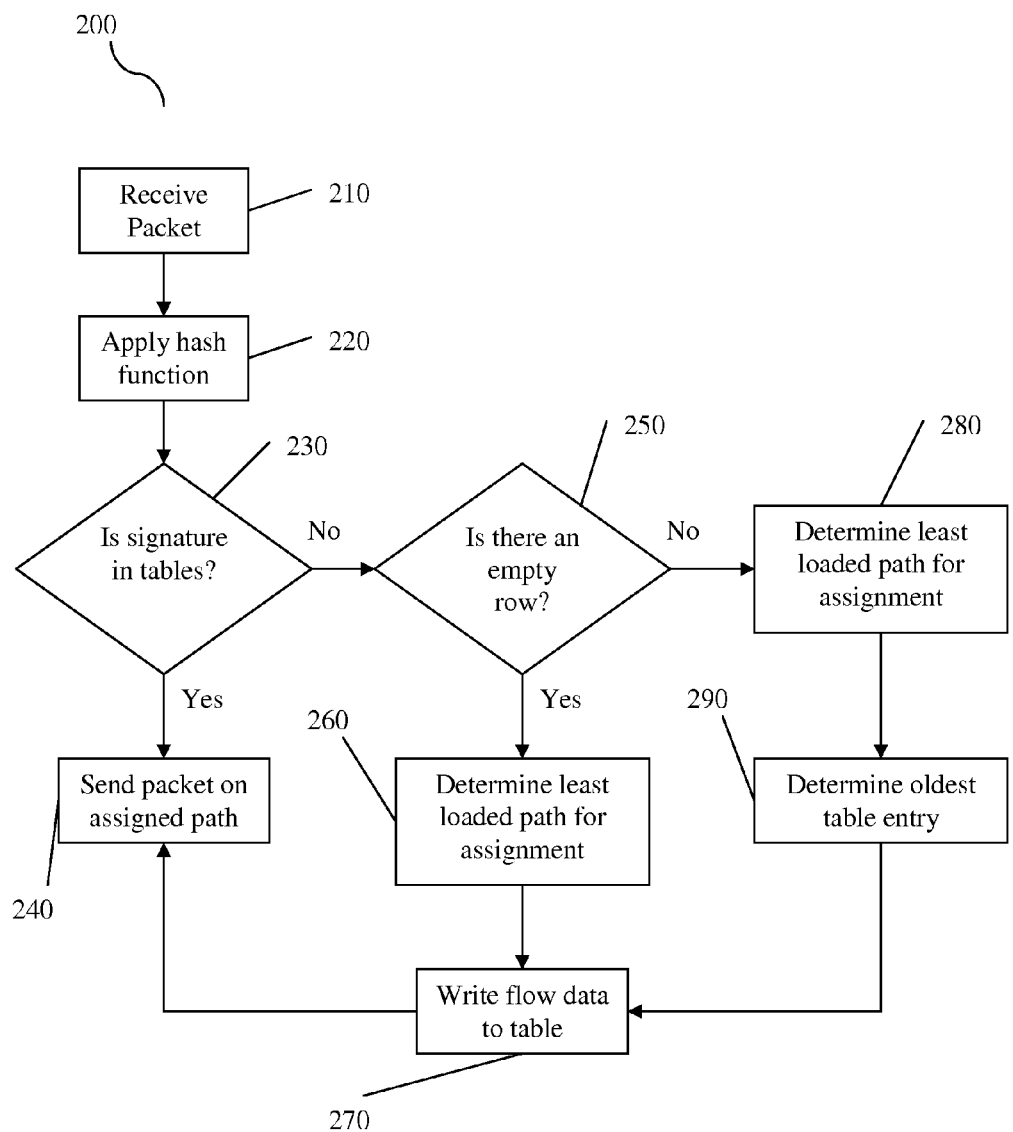
FIG. 2 is a flowchart of an embodiment of a hardware-based dynamic load balancing scheme avoiding packet reordering statistically method.

FIG. 2 is a flowchart of an embodiment of a hardware-based dynamic load balancing scheme avoiding packet reordering statistically method 200. The method 200 begins at step 210 when a packet is received by an embodiment of a hardware based load-balancing device as described herein. After the packet is received, several hash functions may be applied to the packet or the packet header in parallel at step 220. At step 230 signatures are extracted from the hash values calculated in step 220. The signatures are compared against several hash tables. If the signature is in one of the hash tables, the packet is sent on a path determined from the matching hash table entry in step 240.

If the signature is not in any of the hash tables, the tables are checked for an empty row at step 250. If there is an empty row in one of the tables, the least loaded path is determined and a flow associated with the packet is assigned to the least loaded path at step 260. The assigned path, a timestamp, and the signature are written to the empty row in the table, along with any other information that may be required to aid in the load balancing process at step 270. After the data is written to the hash table, the flow is sent along the assigned path at step 240.

If there are no empty rows in the hash tables, the least loaded path is determined and the flow associated with the packet is assigned to the least loaded path at step 280. Next, the oldest entry in the hash tables is determined at step 290. Steps 280 and 290 may occur in any order as required by the load balancer. After the oldest entry in the hash tables is determined and a path is assigned to the packet, the signature, a timestamp and the path are all written to the hash table, replacing the oldest table entry at step 270. After the data is written to the hash table, the packet is sent on the assigned path at step 240.

Figure 3:
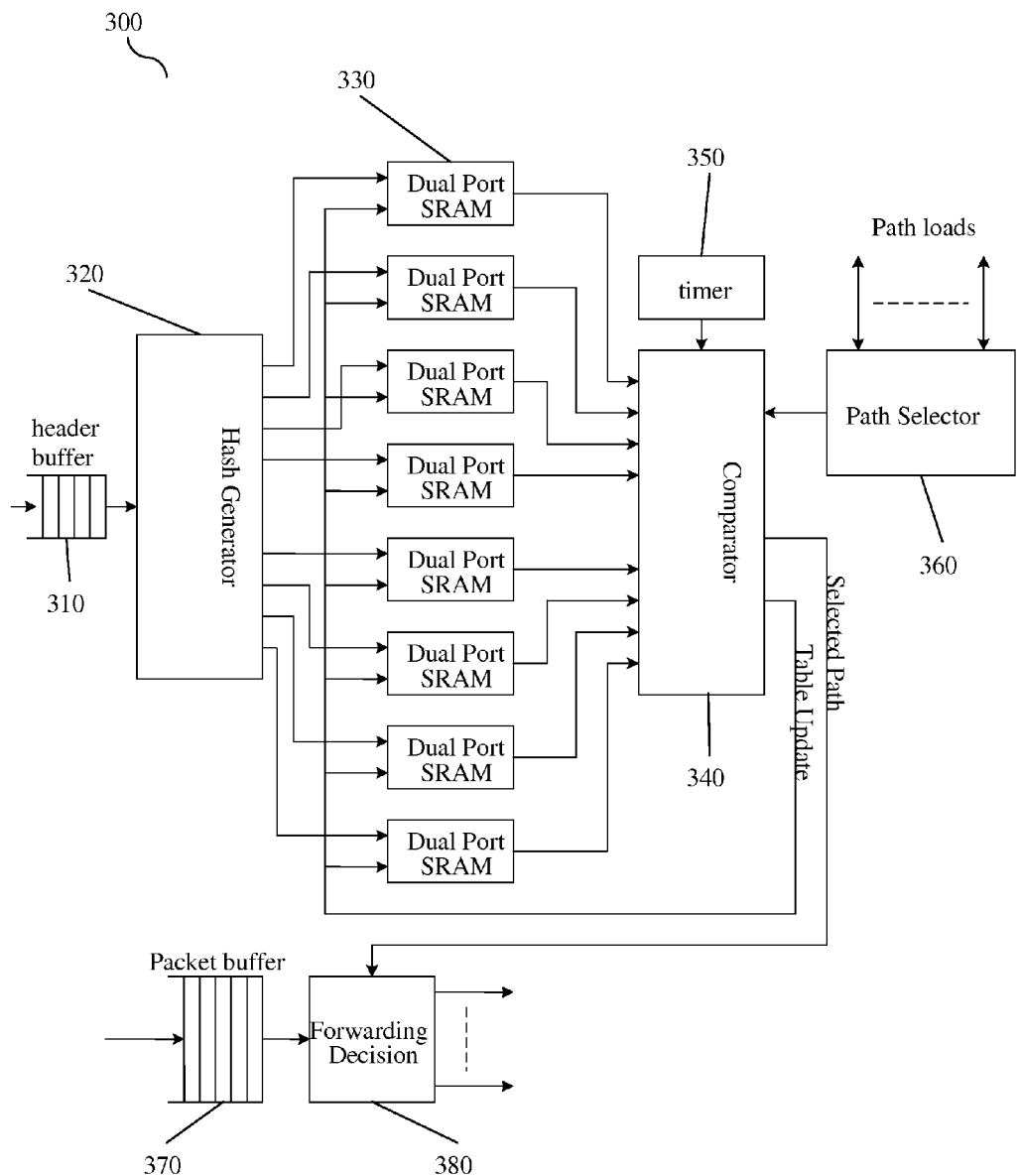
FIG. 3 is a schematic diagram of an embodiment of a field programmable gate array (FPGA) configured for a dynamic load balancing scheme avoiding packet reordering.

FIG. 3 is a schematic diagram of an embodiment of a field programmable gate array (FPGA) configured for a dynamic load balancing scheme avoiding packet reordering. The FPGA 300 may comprise a header buffer 310, a hash generator 320, memory 330, a comparator 340, a timer 350, a path selector 360, a packet buffer 370, and a forwarding decision module 380. The FPGA 300 may for example be an Altera Statix V FPGA or any other FPGA capable of supporting the embodiments described herein. The memory 330 may be segmented into eight blocks to accommodate eight hash tables, one hash table per memory block. Each hash table may comprise four-thousand 64-bit entries. Thus the total memory 330 size allocated may be two Megabytes (MB).

A packet is received by the FPGA 300 and the header of the packet is added to the header buffer 310. The payload of the packet or a copy of the entire packet may be added to the packet buffer 370. The hash generator 320 retrieves a packet header from the header buffer 310. The hash generator 320 hashes the packet header and generates eight addresses to read in the eight hash tables. The data from the hash tables is fed into the comparator 340. The comparator 340 determines which path to send the packet on using information provided by the path selector 360 and timer 350. For example, the path selector 360 may provide the comparator 340 with information regarding the least loaded path, and the timer 350 may provide a current time used in determining the oldest path for eviction, as well as adding a timestamp to the hash table.

Once a decision is made by the comparator 340, the appropriate hash table is updated in one of three ways, replacing an old entry with a new entry, writing a new entry to an empty entry, or updating a timestamp on an existing entry. The decision is also sent to the forwarding decision module 380, where the packet payload is retrieved and the packet is forwarded on the appropriate path.

The FPGA 300 configured as described above may use fully pipelined logic and may be expected to run at three-hundred megahertz (MHz), thus the FPGA 300 may handle up to three-hundred million packets per second. This performance is good enough for worst-case two-hundred gigabits per second (Gbps) line speed or average-case four-hundred Gbps line speed.

Figure 4:
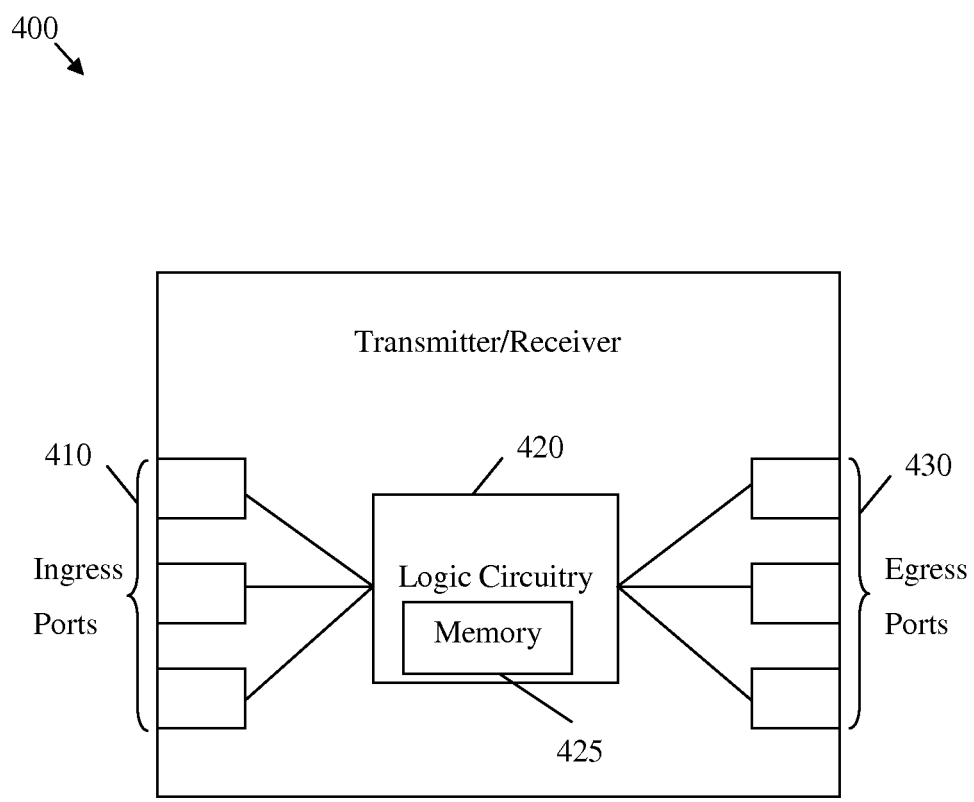
FIG. 4 is a schematic diagram of an embodiment of a transmitter/receiver unit.

FIG. 4 illustrates an embodiment of a transmitter/receiver unit 400, which may be any device that transports packets and/or contents through a network. For instance, the transmitter/receiver unit 400 may be located in the content router or any node in the content network. The transmitted/receiver unit 400 may comprise one or more ingress ports or units 410 for receiving packets, objects, or type-length-values (TLVs) from other network components, logic circuitry 420 to determine which network components to send the packets to, memory 425 that may be used as a buffer, and one or more egress ports or units 430 for transmitting packets to other network components.

Figure 5:
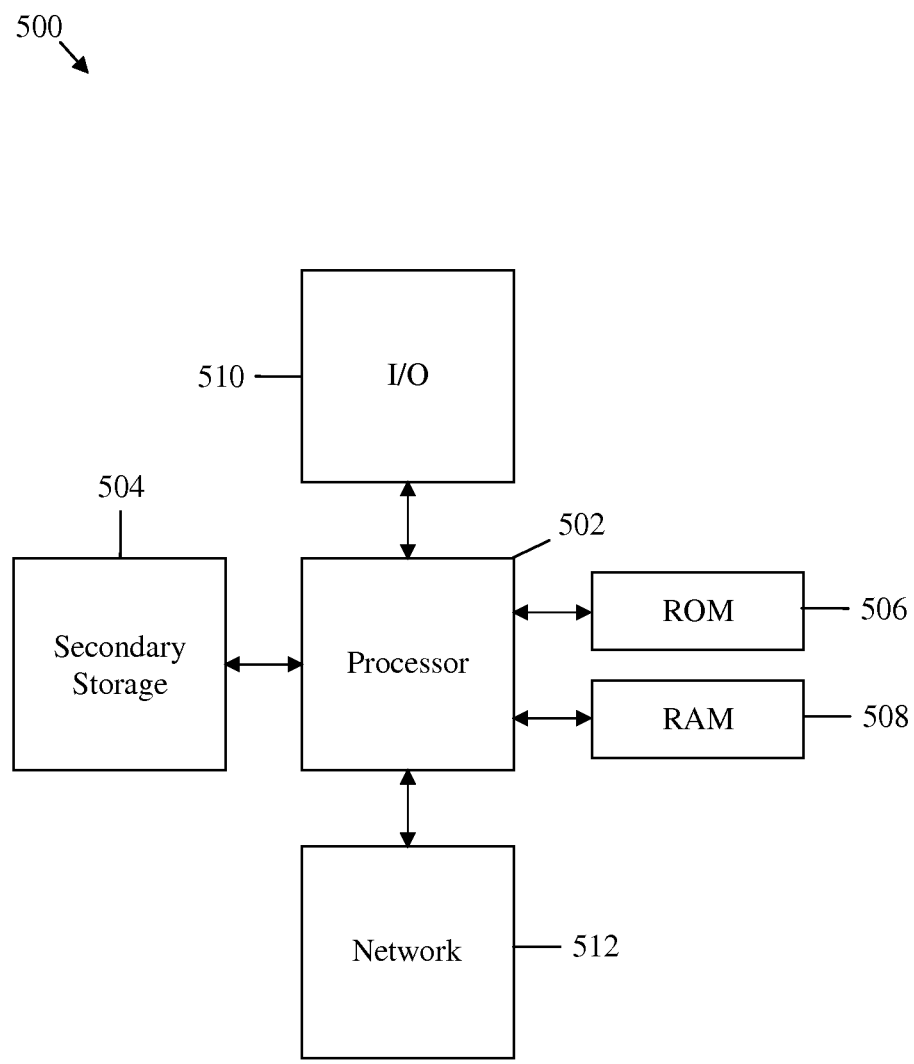
FIG. 5 is a schematic diagram of an embodiment of a general-purpose computer system.

The various embodiments described above may be implemented on any general-purpose network component, such as a computer or network component with sufficient processing power, memory resources, and network throughput capability to handle the necessary workload placed upon it. FIG. 5 illustrates a typical, general-purpose network component 500 suitable for implementing one or more embodiments of the components disclosed herein. The network component 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips, or may be part of one or more application specific integrated circuits (ASICs).

The secondary storage 504 is typically comprised of one or more disk drives or tape drives and is used for non-volatile storage of data and as an over-flow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage 504. The RAM 508 is used to store volatile data and perhaps to store instructions. Access to both ROM 506 and RAM 508 is typically faster than to secondary storage 504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for providing dynamic load balancing that avoids flow packet reordering, the method comprising:
   receiving a packet;
   generating a first hash value that comprises a first portion and a second portion by applying a first hash function to a portion of the packet;
   finding an entry within a first hash table that matches the first portion;
   comparing the second portion to a flow signature field within the entry of the first hash table, wherein the first hash table corresponds to the first hash function;
   determining a least loaded path amongst a plurality of paths to forward the packet when the second portion does not match the flow signature field, wherein the least loaded path is determined by tracking at least one of the following for the paths: a real-time load index for each path, a total number of bytes for each path, a total number of packets for each path, and a total number of flows for each path; and
   forwarding the packet based on the comparison of the second portion to the flow signature field within the entry of the first hash table,
   wherein the flow signature field is used to identify a data flow.

2. The method of claim 1, wherein the entry within the first hash table comprises an identifier field that identifies a path, and wherein the method further comprises selecting the path identified in the entry and forwarding the packet via the path when the second portion matches the flow signature field within the entry of the first hash table.

3. The method of claim 1, wherein the least loaded path is used to forward the packet when the second portion does not match the flow signature field.

4. The method of claim 3, further comprising writing information related to the least loaded path to an empty row in the first hash table when the second portion does not match the flow signature field.

5. The method of claim 4, wherein the information comprises a flow signature value associated with the second portion, a timestamp value of when the packet was received, and an identifier value of the least loaded path.

6. The method of claim 4, further comprising determining an oldest entry in the first hash table and overwriting the oldest entry with information related to the least loaded path when the first entry table does not comprise the empty row.

7. The method of claim 6, wherein determining the oldest entry comprises: evaluating a plurality of timestamp values included in a plurality of entries in the first hash table and comparing the timestamp values.

8. The method of claim 1, wherein the first hash value has a total length of m bits, wherein n bits of the first hash value is the first portion that is associated with an address for the first hash table, wherein m and n are positive integers, wherein a remaining m-n bits of the first hash value is the second portion that is associated with a flow signature value for the packet, and wherein the portion of the packet is a header of the packet.

9. The method of claim 1, further comprising generating, in parallel with generating the first hash value, a second hash value by applying a second hash function to the portion of the packet, wherein the second hash value comprises a third portion and a fourth portion, and wherein the second hash function corresponds to a second hash table.

10. The method of claim 9, further comprising:
    finding a second entry within the second hash table that matches the third portion;
    comparing the fourth portion to a second flow signature field within the second entry of the second hash table; and
    forwarding the packet based on the comparison of the second portion to the flow signature field within the entry of the first hash table and the comparison of the fourth portion to the second flow signature field within the second entry of the second hash table.

11. A computer program product comprising computer executable instructions stored on a non-transitory computer readable medium that when executed by a processor causes a node to perform the following:
    receive a packet comprising a header;
    generate a first hash value by applying a first hash function to the header;
    obtain a hash table address and a flow signature value from the first hash value;
    match an entry within a first hash table to the hash table address;
    compare a flow signature identifier within the entry to the flow signature value to produce a comparison result;
    determine a least loaded path amongst a plurality of paths when the comparison result indicates that the flow signature identifier and the flow signature value mismatch;
    select a forwarding path according to the comparison result, wherein the forwarding path is selected as the least loaded path when the comparison result indicates that the flow signature identifier and the flow signature value mismatch; and
    forward the packet via the forwarding path,
    wherein the flow signature value identifies a data flow associated with the packet.

12. The computer program product of claim 11, wherein the instructions stored on the non-transitory computer readable medium when executed by a processor causes the node to:
    obtain a path identifier within the entry of the first hash table; and
    select a path identified by the path identifier as the forwarding path when the comparison result specifies the flow signature identifier and the flow signature value match.

13. The computer program product of claim 11, wherein the instructions stored on the non-transitory computer readable medium when executed by a processor causes the node to determine a least loaded path amongst a plurality of paths by tracking at least one of the following parameters for the paths: a real-time load index for each path, a total number of bytes for each path, a total number of packets for each path, and a total number of flows for each path.

14. The computer program product of claim 11, wherein the instructions stored on the non-transitory computer readable medium when executed by a processor causes the node to:
    generate a second hash value by applying a second hash function to the header;

obtain a second hash table address and a second flow signature value from the second hash value;

match a second entry within a second hash table to the second hash table address;

compare a second flow signature identifier within the second entry to the second flow signature value to produce a second comparison result; and select the forwarding path according to the comparison result and the second comparison result, wherein the second hash value is generated in parallel with generating the first hash value.

15. The computer program product of claim 14, wherein the forwarding path is a least loaded path when the comparison result specifies that the flow signature identifier and the flow signature value do not match and the second comparison result specifics that the second flow signature identifier and the second flow signature value do not match.

16. An apparatus for providing dynamic load balancing that avoids flow packet reordering, comprising:
a hash generator;
a storage coupled to the hash generator;
a comparator coupled to the storage; and
a forwarding decision module coupled to the comparator,
wherein the hash generator is configured to:
receive a packet header corresponding to a packet; and
generate a first hash value comprising a first hash table address and a first flow
signature value using a first hash function and the packet header,
wherein the storage comprises a first hash table related to the first hash function,
wherein the first hash table comprises one or more hash table entries,
wherein each of the hash table entries comprises a flow signature and a path identification,
wherein the comparator is configured to:
obtain a first flow signature from a first hash table entry located within the first hash table, wherein the first hash table address references the first hash table entry;
compare the first flow signature with the first flow signature value; and determine a selected path based on the comparison of the first flow signature and the first flow signature value, wherein the selected path is a least loaded path amongst a plurality of available paths when the first flow signature mismatches the first flow signature value and the second flow signature mismatches the second flow signature value, wherein the forwarding decision module is configured to forward the packet via the selected path, and wherein the first flow signature value identifies a data flow associated with the packet.

17. The apparatus of claim 16, wherein the storage further comprises a second hash table related to a second hash function, wherein the hash generator is configured to generate a second hash value comprising a second hash table address and a second flow signature value using the second hash function and the packet header, wherein the second hash table address references a second hash table entry located within the second hash table, and wherein the comparator is further configured to:

obtain a second flow signature from the second hash table entry located within the second hash table;

compare the second flow signature with the second flow signature value; and determine the selected path based on at least the comparison of the first flow signature and the first flow signature value and the comparison of the second flow signature and the second flow signature value.

18. The apparatus of claim 17, wherein the selected path is a path identified within the first hash table entry when the first flow signature and the first flow signature value match, and wherein the selected path is a second path identified within the second hash table entry when the second flow signature and the second flow signature value match.

19. The apparatus of claim 16, wherein the least loaded path is determined by tracking at least one of the following for the paths: a real-time load index for each path, a total number of bytes for each path, a total number of packets for each path, and a total number of flows for each path.

* * * * *